United States Patent [19]

Ewald

[11] Patent Number: 5,741,037
[45] Date of Patent: Apr. 21, 1998

[54] SEPTIC TANK LID REMOVING TOOL

[76] Inventor: John R. Ewald, 89 S. Midland, Pontiac, Mich. 48392

[21] Appl. No.: 662,222

[22] Filed: Jun. 12, 1996

[51] Int. Cl.⁶ ................................................. B65G 7/12
[52] U.S. Cl. .......................... 294/149; 294/82.11; 294/15
[58] Field of Search ........................ 294/12, 15, 19.1, 294/74, 26, 82.11–82.14, 149, 153, 156, 170

[56] References Cited

U.S. PATENT DOCUMENTS

| | | | |
|---|---|---|---|
| 2,739,330 | 3/1956 | Hitchcock | 294/12 |
| 2,832,628 | 4/1958 | Turnbull | 294/82.11 |
| 2,846,259 | 8/1958 | Sadler | 294/15 |
| 3,328,064 | 6/1967 | Simon | 294/74 |
| 4,015,762 | 4/1977 | Mendillo | 294/149 |
| 5,351,365 | 10/1994 | Hauck | 294/82.11 |

FOREIGN PATENT DOCUMENTS 3431400  2/1986  Germany ................................ 294/15

*Primary Examiner*—Dean Kramer
*Attorney, Agent, or Firm*—Bliss McGlynn, P.C.

[57] ABSTRACT

A lid removing tool is used to remove a lid from a septic tank opening of a septic tank. The lid removing tool includes an extension member having a first end and a second end and flexible center portion extending therebetween. A hook is secured to the first end and is used to hook a lid hook fixedly secured to the lid of the septic tank. A clasp is attached to the second end and is securable to holes along the flexible center portion of the extension member to adjust the length of the lid removing tool. The flexibility of the lid removing tool allows for a reduction in the amount of earth which must be removed over the lid and provides additional mechanical advantage for the person reducing forces exerted thereby.

5 Claims, 2 Drawing Sheets

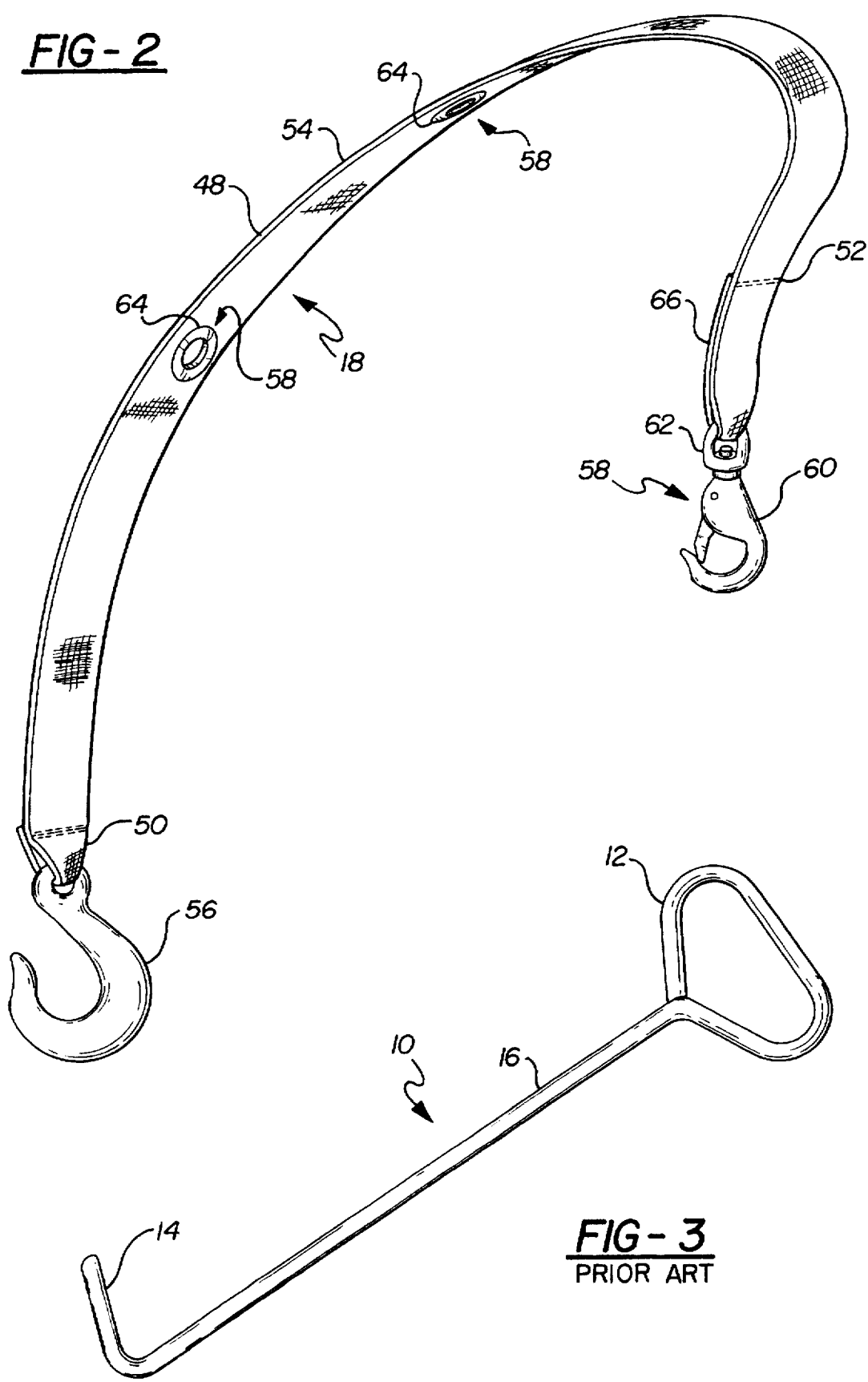

SEPTIC TANK LID REMOVING TOOL

BACKGROUND OF THE INVENTION

1. Field of the Invention

The invention relates to a tool for removing lids. More specifically, the invention relates to a tool for removing lids of septic tanks after the septic tank has been installed in the earth.

2. Description of the Related Art

When septic tanks are inspected and or emptied, a person must dig a hole in the earth above the septic tank lid. The lid must then be removed to either view the contents or remove the contents of the septic tank. Due to the non-standardization of the septic tank industry, each septic tank is buried within the earth a different depth. Therefore, the person inspecting or emptying a septic tank must bring to the site at least one tool to remove the lid. In many cases, the person removing the lid must bring a plurality of tools, each having a different length depending on the depth of the lid of the septic tank. In addition to the difficulty of caring to each site a plurality of different removing tools, these tools provide little in the way of leverage and ease of use. More specifically, the tools are generally elongated straight, inflexible tools with a hook at the end thereof which cannot pivot or rotate with respect to the elongated handle. This increases the difficulty in handling. Therefore, it desirous to have a tool which is flexible in size with extra degrees of freedom allowing someone the opportunity to maximize leverage while reducing the amount of earth which must be removed over the lid.

SUMMARY OF THE INVENTION

Accordingly, a lid removing tool for removing a lid from the septic tank is disclosed. The lid removing tool includes an extension member having a first end and a second end and a flexible center portion extending along a predetermined length between the first and second end. A securing element is fixedly secured to the first end and for removably securing the lid to the extension member. A length adjuster is disposed adjacent the second end of the extension member to adjust the predetermined length of the flexible center portion.

One advantage associated with the invention is the ability to vary the length of the lid removing tool to accommodate leverage requirements and the depth of the lid within the earth. Another advantage associated with the invention is the ability to rotate the securing element with respect to the extension member allowing for greater degrees of freedom in securing the extension member to the lid. Yet another advantage associated with the invention is the ability to reduce the amount of earth removed due to the inflexibility of the lid removing tool.

BRIEF DESCRIPTION OF THE DRAWINGS

Other advantages of the present invention will be readily appreciated as the same becomes better understood by reference to the following detailed description when considered in connection with the accompanying drawings, wherein:

FIG. 2 is a perspective view of the preferred embodiment of the invention; and

FIG. 3 is a perspective view of a lid removing tool of the prior art.

DESCRIPTION OF THE PREFERRED EMBODIMENT(S)

Figure 1:
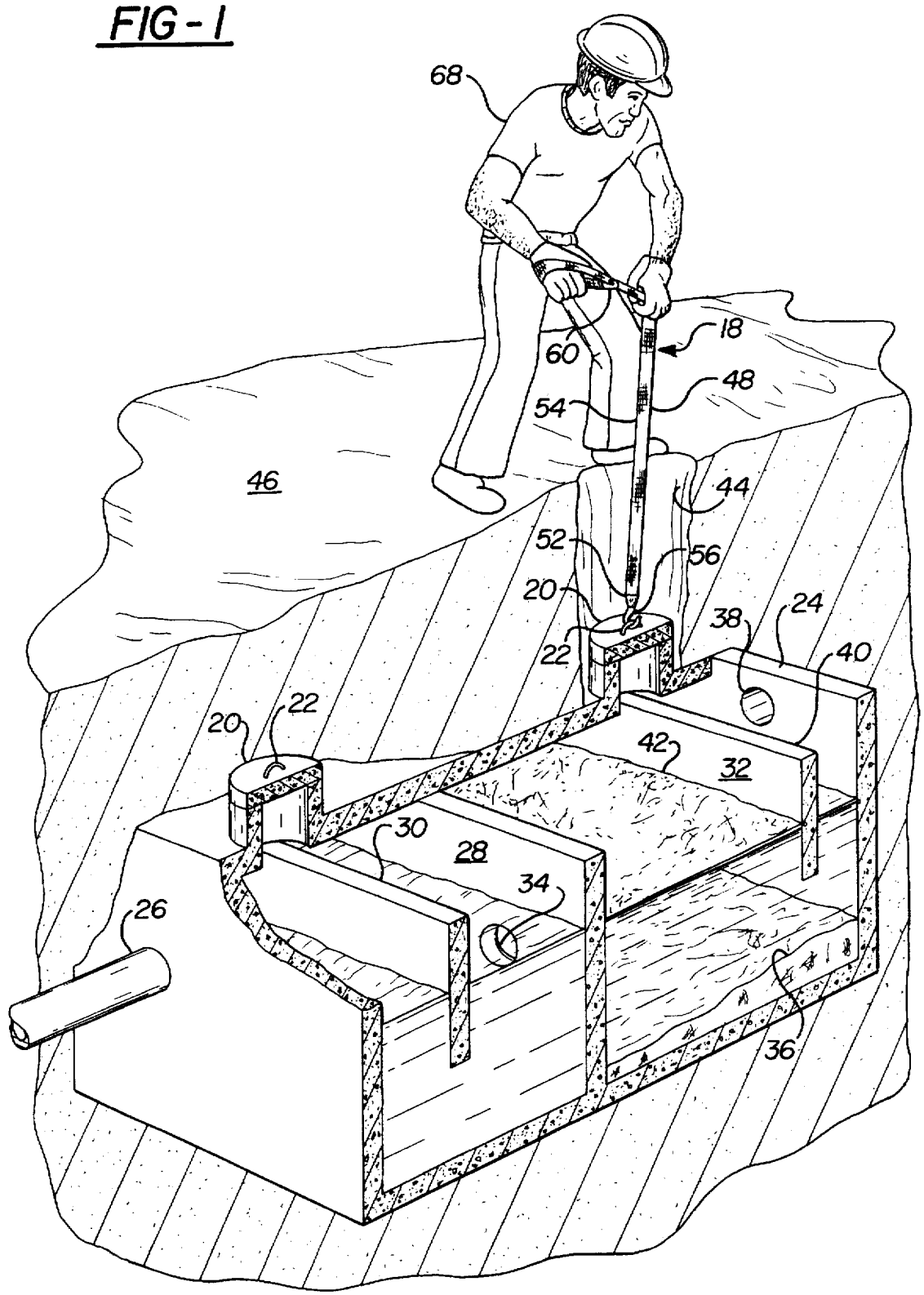
FIG. 1 is a perspective view of a septic tank within the earth, partially cut away, with an operator attempting to remove a septic tank lid using the preferred embodiment of the invention.

Referring to FIG. 3, a removing tool of the prior art is generally indicated at 10. The removing tool includes a handle 12 at one end and a hook 14 at the other. The removing tool of the prior art 10 also includes a straight and inflexible extension 16 extending between the handle 12 and the hook 14. This tool 10 is undesirable because it is inflexible and cannot vary in length. Therefore, many of these removing tools of the prior art 10 must be carried to each job site unless it is known at which depth the septic tank is located. In addition, the hole which must be dug into the earth to remove the lid must be wider in diameter to provide space to allow the hook 14 to attach to the lid. This is costly because it increases manhours in digging for each lid.

Referring to FIGS. 1 and 2, the preferred embodiment of the invention, a lid removing tool for removing a lid 20 from a septic tank, is generally indicated at 18. The lid removing tool 18 removes a lid 20 having a hook 22. The lid 20 is used to cover a septic tank 24.

The septic tank 24 includes an inlet channel 26 which receives fluids and bodily wastes from an enclosure including at least one bathroom (neither shown). The bodily wastes and fluids are collected in a first chamber 28 having a first baffle 30 where the waste products are partially decomposed. The decomposed matter passes through a second chamber 32 through at least one hole 34. Here some soot 36 settles to the bottom of the second chamber 32 and the remaining fluids pass out of the septic tank into a septic field (not shown) through a second hole 38. A second baffle 40 prevents floating scum 42 from exiting the second hole 38 into the septic field. The design and structure of the septic tank 24 and all of its parts are known to those skilled in the art and are not part of the invention.

To reach the lid 20, a hole 44 must be dug in the earth 46. It should be appreciated by those skilled in the art that the hole 44 should be dug as small as possible to reduce costs and damage to the landscaping. Once the hole 44 is dug, the lid removing tool 18 may be used to remove the lid from the septic tank 24.

Referring to FIG. 2, the lid removing tool 18 includes an extension member 48 having a first end 50 and a second end 52. A flexible center portion 54 extends along a predetermined length between the first 50 and second 52 ends. In one embodiment, the extension member 48 is fabricated from a nylon fabric. It should be appreciated by those skilled in the art that alternative materials may be used as long as they are flexible and strong.

A securing element 56 is fixedly secured to the first end 50 of the extension member 48. The securing element 56 removably secures the lid 20 to the extension member 48. The securing element 56 is a hook in the preferred embodiment. The hook 56 may pivot about the first end 50 to secure the lid hook 22 easily.

A length adjuster is generally indicated at 58. The length adjuster 58 is disposed adjacent the second end 52 of the extension member 48. The length adjuster 58 adjusts the predetermined length of the flexible center portion 54. The length adjuster 58 includes a clasp 60 which is fixedly secured to the second end 52. The clasp is rotatably secured to the second end 52 by a rotatable holder 62. The rotatable holder 62 allows for ease and use of the length adjuster 58.

The length adjuster 58 also includes at least one receiving member 64. The receiving member 64 is a hole which extends through the flexible center portion 54 of the extension member 48. The receiving member 64 receives the clasp 60 therethrough. In the embodiment shown in FIG. 2, the length adjuster 58 includes two receiving members 64. By securing the clasp 60 to either of the receiving members 64, the length of the flexible center portion 54 may be changed or adjusted. The receiving members 64 extend through the flexible center portion 54 between the first 50 and second 52 ends.

A handle 66 is disposed adjacent the second end 52 and is used to secure the rotatable holder 62 to the second end 52. The handle 66 may be used when all of the length of the center portion 54 is required to reach the lid 20 covering the opening to the septic tank 24.

In operation, the lid removing tool 18 is secured to the lid hook 22 of the lid 20 after the hole 44 has been dug. The person 68 then adjusts the length of the flexible center portion 54 by securing the clasp 60 into one of the receiving members 64 along the length of the flexible center portion 54. The person 68 then pulls the lid 20 up away from the septic tank 24. If necessary, the person 68 may readjust the length adjuster 58 by removing the clasp 60 from the receiving member 64 it is currently extending through and resecuring the clasp 60 to another receiving member 64. By readjusting the length of the flexible center portion 54, the operator minimizes the amount of torques required to lift the lid 20 out of a very deep hole. Also, readjusting the length of the flexible center portion 54 will allow the person 68 to minimize the forces exerted thereby when the lid 20 is exceptionally heavy, as is the case when the lid 20 is a replacement lid which extends across an area twenty inches by twenty four inches and is solid concrete.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

I claim:

1. A lid removing tool for removing a lid from a septic tank opening of a septic tank, said lid removing tool comprising:

an extension member having a first end and second end and a flexible center portion extending along a predetermined length between said first and second ends;

a securing element fixedly secured to said first end for removably securing the lid to said extension member; and a length adjuster disposed adjacent said second end of said extension member to adjust said predetermined length of said flexible center portion, said length adjuster including a clasp fixedly secured to said second end.

2. A lid removing tool as set forth in claim 1 wherein said length adjuster further includes at least one receiving member for removably receiving said clasp therethrough.

3. A lid removing tool as set forth in claim 2 wherein said receiving member is a hole extending through said flexible center portion between said first and second ends.

4. A lid removing tool as set forth in claim 1 including a handle disposed adjacent said second end.

5. A lid removing tool for removing a lid from a septic tank opening of a septic tank, said lid removing tool comprising:

an extension member having a first end and a second end and a flexible center portion extending along a predetermined length between said first and second ends;

a securing element fixedly secured to said first end for removably securing the lid to said extension member; and a length adjuster disposed adjacent said second end of said extension member to adjust said predetermined length of said flexible center portion, said length adjuster including a clasp fixedly secured to and rotatable with respect to said second end.

* * * * *